United States Patent
Liu et al.

(10) Patent No.: US 9,036,003 B2
(45) Date of Patent: May 19, 2015

(54) MULTI-PITCHING ANGLE SUSPENDED 3D DISPLAY DEVICE WITH 360-DEGREE FIELD OF VIEW

(75) Inventors: Xu Liu, Hangzhou (CN); Xinxing Xia, Hangzhou (CN); Yifan Peng, Hangzhou (CN); Haifeng Li, Hangzhou (CN); Zhenrong Zheng, Hangzhou (CN)

(73) Assignee: ZHEJIANG UNIVERSITY, Hangzhou, Zhejiang Province (CN)

( * ) Notice: Subject to any disclaimer, the term of this patent is extended or adjusted under 35 U.S.C. 154(b) by 343 days.

(21) Appl. No.: 13/808,564

(22) PCT Filed: Sep. 5, 2011

(86) PCT No.: PCT/CN2011/079317
§ 371 (c)(1),
(2), (4) Date: Jan. 4, 2013

(87) PCT Pub. No.: WO2013/026216
PCT Pub. Date: Feb. 28, 2013

(65) Prior Publication Data
US 2014/0204185 A1    Jul. 24, 2014

(30) Foreign Application Priority Data
Aug. 24, 2011  (CN) .......................... 2011 1 0247653

(51) Int. Cl.
| | |
|---|---|
| *H04N 7/00* | (2011.01) |
| *H04N 13/04* | (2006.01) |
| *G02B 26/08* | (2006.01) |
| *G02B 5/20* | (2006.01) |
| *G02B 5/18* | (2006.01) |
| *G02B 5/32* | (2006.01) |
| *G02B 27/22* | (2006.01) |

(52) U.S. Cl.
CPC ............ *H04N 13/0447* (2013.01); *G02B 5/203* (2013.01); *G02B 5/1823* (2013.01); *G02B 5/1828* (2013.01); *G02B 5/32* (2013.01); *H04N 13/0402* (2013.01); *H04N 13/045* (2013.01); *H04N 13/0459* (2013.01); *H04N 2213/001* (2013.01); *G02B 26/0875* (2013.01); *G02B 27/2214* (2013.01); *G02B 27/2292* (2013.01); *H04N 13/0427* (2013.01); *H04N 13/0443* (2013.01); *H04N 13/0404* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,388,735 A | * | 6/1968 | Sayce | ............................. 164/47 |
| 4,206,965 A | * | 6/1980 | McGrew | ........................... 359/9 |

(Continued)

*Primary Examiner* — Dave Czekaj
*Assistant Examiner* — Tyler W Sullivan
(74) *Attorney, Agent, or Firm* — Jacobson Holman PLLC; Jiwen Chen

(57) ABSTRACT

This invention discloses a multi-pitching angle suspended space 3D display device with 360° FOV, comprising: a transmitted composite deflective diffusing screen, a high speed projector, an image generator, a detecting module and a rotating drive mechanism. The high speed projector projects the composite images of the 3D objects of different pitching angles and horizontal 360° views to the composite deflective diffusing screen that rotates at a high speed. The composite deflective diffusing screen is able to control the vertical deflecting and scattering angles and horizontal diffusing angle for incident rays with different angles, allowing the surrounding viewers at different height levels to see the images corresponding to their viewpoints, making the displayed 3D objects suspended over the composite deflecting scattering screen, of which the position does not change as the height of the viewpoint changes. The multi-pitching angle suspended space 3D display device with 360° FOV allows watching by multiple persons at multiple pitching angles and horizontal 360° FOV in naked eyes, realizing space occlusion, exploration and interaction.

6 Claims, 3 Drawing Sheets

(56) References Cited

U.S. PATENT DOCUMENTS

| | | |
|---|---|---|
| 7,059,729 B2 * | 6/2006 | Hoshino et al. ................. 353/94 |
| 8,187,771 B2 * | 5/2012 | Staub et al. ....................... 430/2 |
| 2002/0163573 A1 | 11/2002 | Bieman et al. |
| 2005/0283071 A1 * | 12/2005 | Ripoll et al. ................... 600/425 |
| 2007/0159692 A1 * | 7/2007 | Hirose et al. .................. 359/460 |
| 2007/0165303 A1 * | 7/2007 | Osawa et al. .................. 359/460 |
| 2007/0177263 A1 * | 8/2007 | Ono .............................. 359/457 |
| 2012/0147003 A1 * | 6/2012 | Liu et al. ....................... 345/419 |

* cited by examiner

MULTI-PITCHING ANGLE SUSPENDED 3D DISPLAY DEVICE WITH 360-DEGREE FIELD OF VIEW

TECHNICAL FIELD

The present invention relates to three-dimensional (3D) display technical field, and more specifically, relates to a multi-pitching angle suspended space 3D display device with 360° field of view (FOV).

BACKGROUND TECHNOLOGY

Our real world is a 3D world, and two-dimensional (2D) panel display and projection displays have lagged behind people's demand for the display technology. New technology that can objectively represent the 3D objects as in the real world is required. Different from traditional 2D display which can only display 2D information, 3D display adds image depths to generate stereo display. Comparing to traditional 2D display, 3D display adds information of image depths. Therefore, the major technical difficulty of 3D technology is the acquisition, processing, transmission and representation of the enormous amount of 3D data.

Current major 3D display technologies comprise: stereoscopic 3D display, autostereoscopic 3D display, holographic 3D display and space 3D display.

Stereoscopic 3D display is to allow the viewer's right and left eyes to receive the right and left image, respectively, through viewing aids such as glasses to achieve binocular parallax for the stereoscopic visual effect. Current popular 3D movies and videos on the market mostly adopt this method. This type of 3D display can provide visual effects of depth. However, due to the limit of two-view information, the viewer will see the same 3D scene from different positions, and the scene does not change when the viewer's position changes. In addition, this type of 3D presentation may cause negative effects to the viewers, such as headache and nausea, if viewed for a long time.

Autostereoscopic 3D display does not require viewing aids. It achieves 3D display for naked eyes with a limited number of view areas through providing separated viewing areas. This type of 3D display method provides a limited number of viewing angles at small watching areas, thus cannot satisfy people's demand for 3D display.

Holographic 3D display records the specific wavefront emitted by the object in the form of interference fringes and reconstructs it under a certain condition utilizing the light interference to form the 3D image of the original object. Holographic 3D display retains complete information of amplitudes and phases of the object wave, which allows the viewer to observe the visual effect that is completely the same as the original object, retaining all the depth cues. This is an ideal 3D display method. However, holographic 3D display requires enormous amount of information data, huge storage space and high quality spatial light modulator. For the time being, dynamically refreshing holographic 3D display generally is not possible.

Space 3D display comprises volumetric 3D display and omni-directional view 3D display.

Volumetric 3D display is to simulate the distribution of the 3D objects in the physical space, and display information of voxels in 3D space. Through displaying the scanned image of the voxels in the whole space while controlling the brightness of the voxels, 3D image display is realized. Although this 3D display method allows multiple persons to view with naked eyes, the 3D scene presented is transparent and space has no occlusion.

Omni-directional view 3D display is to represent corresponding object image in every direction in the whole space. This 3D display not only allows surrounding multiple persons to view the image in naked eyes, but also provides correct occlusion relationship. Generally, this 3D display has high-density view pitch, requiring enormous amount of data storage and transmission. The omni-directional view 3D display in the prior art is to display a cycle of discrete images sequence corresponding to the surrounding view points in the horizontal 360° direction. Through limiting the viewing angle of the image by the directional diffusing screen, each image is visible within the small scope close to its view point only, and the surrounding viewers will see different images that corresponding to their view points, realizing 3D effects. However, omni-directional view 3D display relies on various screens or display media, and the 3D scene in the prior art displays within the screen. With the screen, surrounding viewers will not be able to touch and interact, and therefore the sense of reality is not strong enough.

SUMMARY OF THE INVENTION

This invention provides a multi-pitching angle suspended space 3D display device with 360° FOV, which realizes real space 3D display suspended in the air with multiple vertical pitching angles and 360° horizontal viewing angles, allowing viewers to touch and interact while watching the images, overcoming disadvantages of the prior art.

A multi-pitching angle suspended space 3D display device with 360° viewing angles, comprising: a transmitted composite deflective diffusing screen, a high speed projector, an image generator, a detecting module and a rotating drive mechanism. The transmitted composite deflective diffusing screen is connected with, and rotates under the drive of the rotating drive mechanism; the high speed projector is arranged under the transmitted composite deflective diffusing screen, and is sequentially connected with the image generator and the detecting module.

The transmitted composite deflective diffusing screen comprises a transmitted composite saw-toothed grating and a cylindrical grating parallel to each other in the grating direction, wherein the transmitted composite saw-toothed grating is in a periodic arrangement, with each period comprising triangular prism structures at different tilt angles; the number of the triangular prism structures in each period is the number of the pitching angles, with the triangular prism structure at the same angle of inclination in different periods corresponding to the same pitching angle.

The high speed projector projects the image upwards to the transmitted composite deflective diffusing screen; the detecting module detects the rotating speed and the initial position of the transmitted composite deflective diffusing screen, and sends the signal of the rotating speed and the initial position to the image generator; the image generator controls the initial image No. and the projecting frame frequency of the high speed projector according to the signal received, realizing synchronism of the image sequence projected by the said high speed projector and the rotation of the said transmitted composite deflective diffusing screen.

In the small area corresponding to each period, the transmitted composite deflective diffusing screen deflects the light rays projected by the high speed projector to one side in multiple angles, and scatters in the deflecting direction, and transmits in small angle in the direction perpendicular to the deflecting direction.

Another type of multi-pitching angle suspended space 3D display device with 360° FOV comprises: a reflective composite deflective diffusing screen, a high speed projector, an image generator, detecting module and a rotating drive mechanism. The reflective composite deflecting scattering screen is connected with and rotates under the drive of the rotating drive mechanism; the high speed projector is arranged over the reflective composite deflective diffusing screen, and is sequentially connected with the image generator and the detecting module.

The reflective composite deflective diffusing screen comprises a reflective composite saw-toothed grating and a cylindrical grating parallel to each other in the grating direction, the reflective composite saw-toothed grating is arranged under the cylindrical grating; wherein the reflective composite saw-toothed grating is in a periodic arrangement, with each period comprising triangular prism structures at different tilt angles and the surface of each triangular prism structure plated with reflective coating for reflecting the light rays; the number of the triangular prism structures in each period is the number of the pitching angles, with the triangular prism structure at the same angle of inclination in different periods corresponding to the same pitching angle.

The high speed projector projects the image downwards to the reflective composite deflective diffusing screen; the detecting module detects the rotating speed and the initial position of the reflective composite deflective diffusing screen, and sends the signal of the rotating speed and the initial position to the image generator; the image generator controls the initial image No. and the projecting frame frequency of the high speed projector according to the signal received, realizing synchronism of the image sequence projected by the high speed projector and the rotation of the reflective composite deflective diffusing screen.

In the small area corresponding to each period, the reflective composite deflective diffusing screen deflects the light rays projected by the high speed projector to one side in multiple angles, and scatters in the deflecting direction, and reflects in small angle in the direction perpendicular to the deflecting direction.

In the present invention, the image generator is an FPGA (Field Programmable Gate Array)-based control module, a DSP (digital-signal-processor)-based control module or a computer.

In the present invention, the detecting module is a photosensor or a mechanical position switch.

The multi-pitching angle suspended space 3D display device with 360° FOV provided in this invention integrates the high speed projector and the composite deflective diffusing screen, and separates the display media from the 3D display space, forming a real space 3D display that has multiple vertical pitching angles and full horizontal 360° FOV suspended in the air, allowing viewers to touch and interact while watching.

Comparing to the suspended space 3D display that has one vertical pitching angle only, the multi-pitching angle suspended space 3D display device with 360° FOV provided in this invention not only realizes panoramic space 3D display in the horizontal direction, but also allows multiple vertical pitching angles, forming a panoramic space 3D display that adapts to watching from various height levels. The position of the 3D object in the display space does not change as the height of the viewers' eyes changes, allowing the viewers to see the 3D images corresponding to their positions from different height levels. The represented 3D scene suspends in the physical space above the screen, allowing multiple persons to watch from different height levels in naked eyes at the same time, and exploration and interaction is also allowed, more close to the objective ways in which people feel the real objects.

BRIEF DESCRIPTIONS OF THE DRAWINGS

Figure 1:
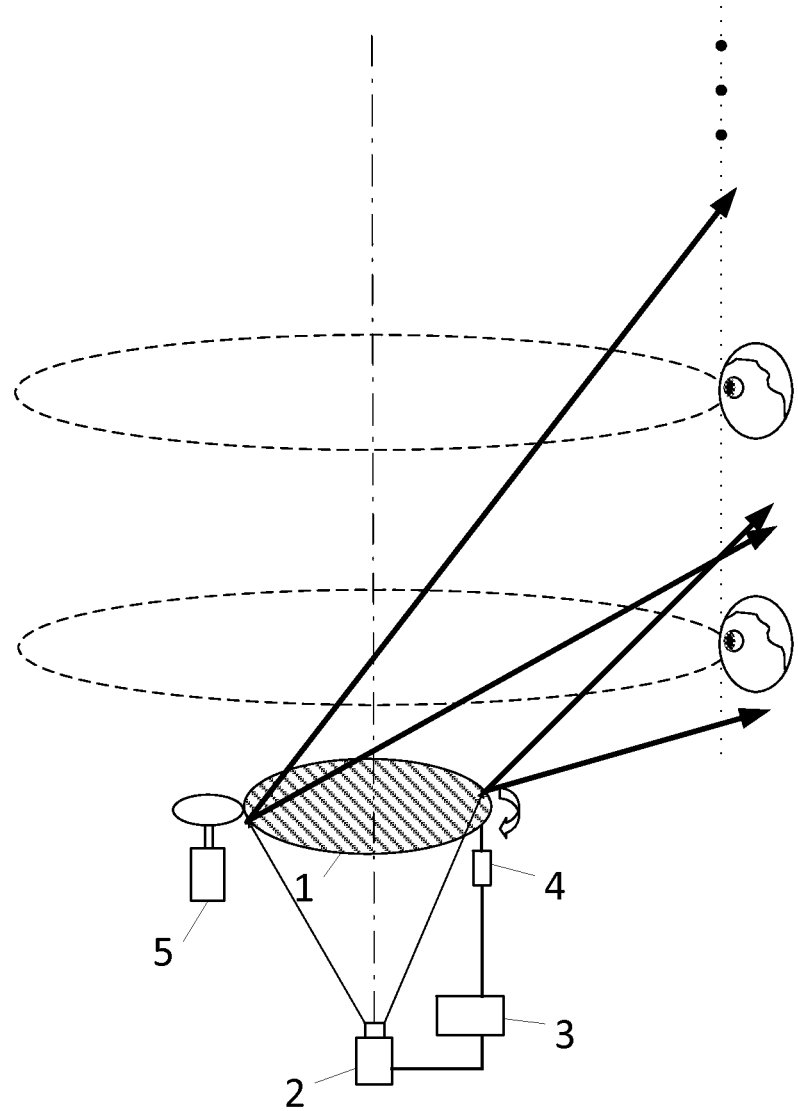
FIG. 1 illustrates an implementation of the multi-pitching angle suspended space 3D display device with 360° FOV provided in this invention.

In the drawings: transmitted composite deflective diffusing screen 1, high speed projector 2, image generator 3, detecting module 4, rotating drive mechanism 5, reflective composite deflective diffusing screen 6, transmitted composite saw-toothed grating 11, the first cylindrical grating 12, reflective composite saw-toothed grating 61, the second cylindrical grating 62.

SPECIFIC EMBODIMENTS OF THE INVENTION

Below will explain the present invention in detail in embodiments in combination with drawings. The present invention is not limited to the following only.

Embodiment 1

As shown in FIG. 1, a multi-pitching angle suspended space 3D display device with 360° FOV comprises: a transmitted composite deflective diffusing screen 1, a high speed projector 2, an image generator 3, a detecting module 4 and a rotating drive mechanism 5.

Figure 2:
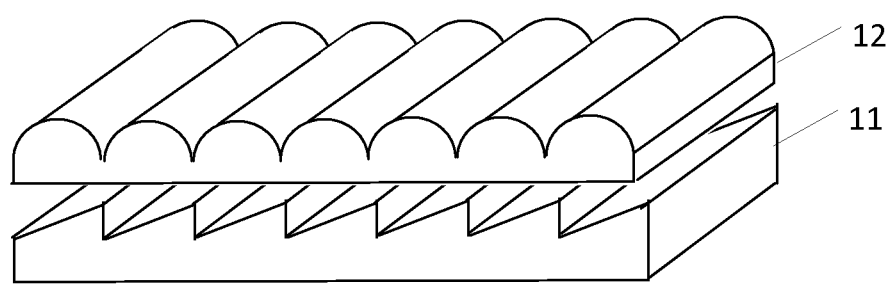
FIG. 2 illustrates the structure of the transmitted composite deflective diffusing screen in FIG. 1.
Figure 3:
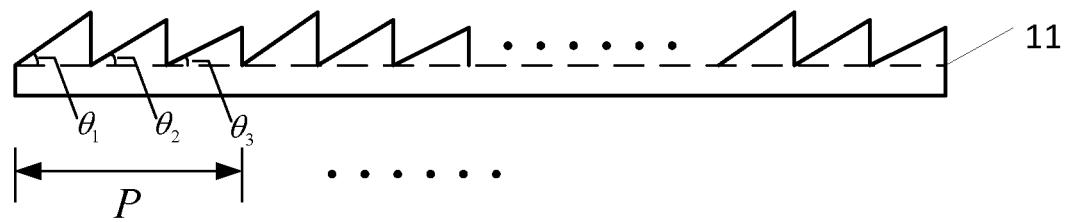
FIG. 3 illustrates the cross section of the transmitted composite saw-toothed grating in FIG. 2.

The structure of the transmitted composite deflective diffusing screen 1 is as shown in FIG. 2, which comprises transmitted composite saw-toothed grating 11 and the first cylindrical grating 12; transmitted composite saw-toothed grating 11 is arranged under the first cylindrical grating 12, and transmitted composite saw-toothed grating 11 is parallel to the first cylindrical grating 12 in the grating direction. Wherein the structure of transmitted composite saw-toothed grating 11 is as shown in FIG. 3, which is in a periodic arrangement, with each period comprising triangular prism structures at different tilt angles (as shown in FIG. 3, the angles of inclination of the triangular prism structures in one cycle are respectively $\theta 1$, $\theta 2$ and $\theta 3$), the number of the triangular prism structures in each period is the number of the pitching angles, with the triangular prism structure at the same angle of inclination in different cycles corresponding to the same pitching angle.

The transmitted composite deflective diffusing screen 1 is connected with a rotating drive mechanism 5, which drives the transmitted composite deflective diffusing screen 1 to rotate at a high speed. The rotating drive mechanism 5 generally drives the transmitted composite deflective diffusing screen 1 to rotate through a gear drive, a worm drive and a belt drive etc.

The high speed projector 2 is arranged under the transmitted composite deflective diffusing screen 1, which projects the image sequence processed ready upwards to the transmitted composite deflective diffusing screen 1. The lens' optical axis of high speed projector 2 coincides with the rotating axis of the transmitted composite deflective diffusing screen 1.

The high speed projector 2 is sequentially connected with the image generator 3 and the detecting module 4. The detecting module 4 detects the rotating speed and initial position of the transmitted composite deflective diffusing screen 1, and sends the signal to the image generator 3, which controls the initial image No. and the projecting frame frequency of the high speed projector 2, realizing synchronism of the image sequence projected by the high speed projector 2 and the rotation of the transmitted composite deflective diffusing screen 1. In this embodiment, the image generator 3 is an FPGA-based control module or a DSP-based control module or a computer. The detecting module 4 is a photosensor or a mechanical position switch.

In the multi-pitching angle suspended space 3D display device with 360° FOV described above, when going through the transmitted composite deflective diffusing screen 1, the light rays projected by the high speed projector 2 are first refracted or reflected through the transmitted composite saw-toothed grating 11 for light ray deflection, the emitting angles in the grating direction and in the direction perpendicular to the grating direction of the deflected light rays are then respectively limited by the first cylindrical grating 12, and finally the light rays emit at a small diffusing angle in the grating direction (i.e. small angle projection), and scatter in the direction perpendicular to the grating direction at a certain angle.

When the light rays projected by the high speed projector 2 go through transmitted composite saw-toothed grating 11 to be refracted or reflected for light ray deflection, the deflecting angle is related to the refractive index of the transmitted composite saw-toothed grating 11 and the angles of inclination of the triangular prism structures in the transmitted composite saw-toothed grating 11. Since the refractive index of transmitted composite saw-toothed grating 11 is a fixed value, the deflecting angle is determined by the specific position of the light rays projected to the transmitted composite deflective diffusing screen 1, and the deflecting direction and angles of the projected light rays are determined by the angles of inclination of the triangular prism structures of the transmitted composite saw-toothed grating 11. Therefore, the generated deflecting angles corresponding to the multiple triangular prism structures of different angles of inclination in each transmitted saw-toothed grating cycle in the transmitted composite saw-toothed grating 11 vary, whereas the deflecting angles corresponding to the triangular prism structures of the same angle of inclination in different cycles are the same. It is thus clear that the generated deflecting angles corresponding to the transmitted composite saw-toothed grating 11 consisting of transmitted saw-toothed gratings in periodic arrangement is a repeated arrangement of angle period of multiple deflecting angles. It is also clear that in the small area corresponding to each period, the transmitted composite deflective diffusing screen 1 deflects the light rays projected by the high speed projector 2 to one side at multiple angles, and scatters at a certain angle in the deflecting direction, and transmits at a small angle in the direction perpendicular to the deflecting direction.

When the deflected light rays go through the first cylindrical grating 12 and emit at a small diffusing angle in the direction perpendicular to the deflecting direction (i.e. small angle projection), the diffusing angle shall be less than 360/M° (M is the number of the images projected by the high speed projector 2 when transmitted composite deflective diffusing screen 1 rotates one cycle). Meanwhile, when going through the first cylindrical grating 12, the deflected light rays scatter in the deflecting direction at a certain angle that is related to the number and sizes of N separated circular watching areas. It needs to be ensured that each circular watching area of the N circular watching areas can see the image corresponding to that pitching angle but cannot see the images corresponding to other pitching angles. The scattering angle can be determined by selecting the cylindrical diameter and the refractive index of the first cylindrical grating 12.

Assuming that the length of each period in the transmitted composite saw-toothed grating 11 is P, and there are N triangular prism structures of different angles of inclination in each period, set the bottom side length of each triangular prism structure as p, then P=pN. Since the number of the triangular prism structure in each period is the number of the pitching angles, the 3D display device has N pitching angles vertically, and accordingly, there are N separated circular areas of different height levels around the display device for viewers at different height levels to watch the panoramic space 3D display.

When the transmitted composite deflective diffusing screen 1 is fixed, for the viewpoints of different height levels in the N separated circular watching areas corresponding to the same horizontal position, the image seen from each viewpoint is a narrow strip image projected for that viewpoint by the high speed projector 2, and therefore the images seen from views of different height levels are different. Assuming that the resolution of the narrow strip image projected by the high speed projector 2 corresponding to a certain horizontal position is W×H, the resolution of the narrow strip image seen from each viewpoint that corresponds to the same horizontal position in the N separated circular areas is W×(H/N). This is because when there are N triangular prism structures of different angles of inclination in each transmitted saw-toothed grating period, the deflecting angles generated by the transmitted composite saw-toothed grating11 are repeated arrangement of angle period of N different deflecting angles, and the same deflecting angle corresponds to the same pitching angle (i.e., to the same view point), then the narrow strip image seen from each viewpoint is the composite of the deflected light rays that have the same deflecting angle in all the periods emitted from the first cylindrical grating 12.

When the transmitted composite deflective diffusing screen1 rotates, for the viewpoints at different height levels in the N separated circular watching areas corresponding to the same horizontal position, the image seen from each viewpoint is the composite image consisting of the strips of different positions of multiple continuous images projected for that viewpoint by the high speed projector 2.

When the transmitted composite deflective diffusing screen 1 turns one cycle, and the high speed projector 2 projects M images, then when the transmitted composite deflective diffusing screen 1 turns 360/M°, the high speed projector 2 changes one image. To satisfy the visual persistence of naked eyes, a high refresh rate is required, which requires increasing the rotating speed of the transmitted composite deflective diffusing screen 1. Assuming the rotating speed of the transmitted composite deflective diffusing screen 1 is ω, then the frame frequency F of the high speed projector 2 is Mw, and the refresh rate of the 3D scene is also ω. When the angular density of the views is high enough, the two naked eyes will be in two different view areas and see two different images to produce stereo visual effects, and the 3D scene formed is suspended above the transmitted composite deflective diffusing screen 1. When the transmitted composite deflective diffusing screen 1 rotates a cycle, the number of the images projected by the high speed projector 2 is generally over 200, i.e., M≥200. If the system refresh rate ω is at 15 r/s, the frame frequency F of the projector needs to reach at least 3000 frames/s, and a high frame frequency projector is required. Since this multi-pitching angle 3D display is to separate the image of the same time to different pitching angles, which results in decrease of the image resolution for a single viewpoint. To improve the image resolution of different viewpoints, the spacial light modulator of the high speed projector needs high resolution. The most commonly used high speed projector 2 is a single-chip or three-chip DMD (digital micromirror device) projector.

In this embodiment, to ensure the separation of the images of different pitching angles, the projected images of the high speed projector 2 need to correspond to each position of each triangular prism structure in the transmitted composite sawtoothed grating 11.

Embodiment 2

Figure 4:
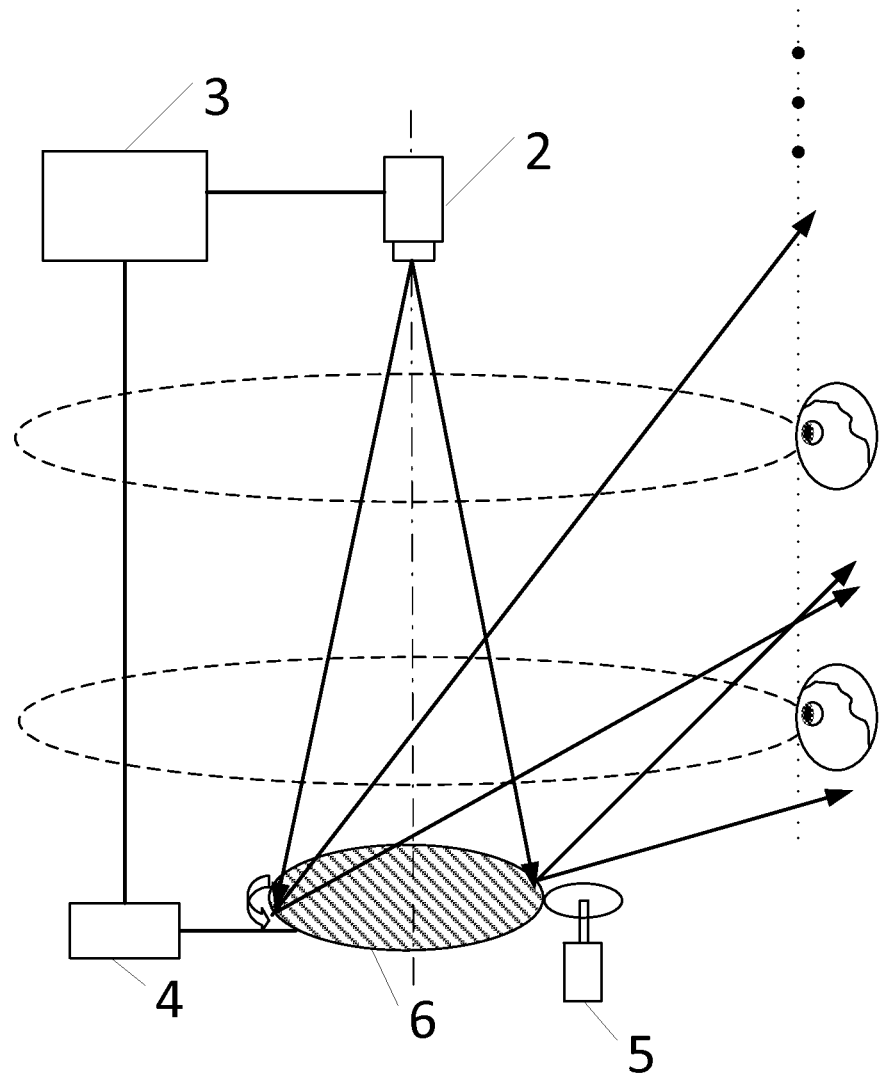
FIG. 4 illustrates another implementation of the multi-pitching angle suspended space 3D display device with 360° FOV provided in this invention.

As shown in FIG. 4, another multi-pitching angle suspended space 3D display device with 360° FOV comprises: a high speed projector 2, an image generator 3, a detecting module 4, a rotating drive mechanism 5 and a reflective composite deflective diffusing screen 6.

Figure 5:
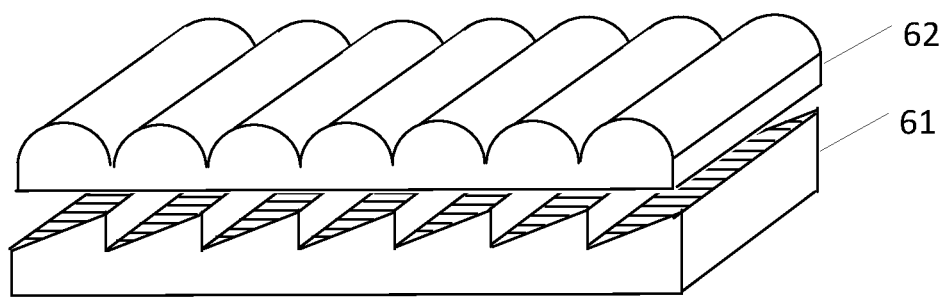
FIG. 5 illustrates the structure of the reflective composite deflective diffusing screen in FIG. 4.
Figure 6:
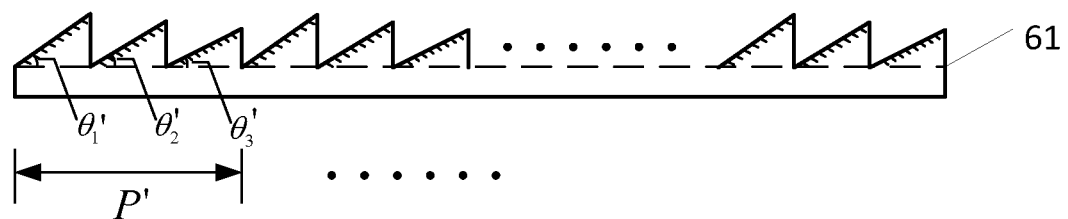
FIG. 6 illustrates the cross section of the reflective composite saw-toothed grating in FIG. 5.

The structure of the reflective composite deflective diffusing screen 6 is as shown in FIG. 5, which comprises a reflective composite saw-toothed grating 61 and the second cylindrical grating 62; The reflective composite saw-toothed grating 61 is arranged under the second cylindrical grating 62, and the reflective composite saw-toothed grating 61 is parallel to the second cylindrical grating 62 in the grating direction. Wherein the structure of the reflective composite sawtoothed grating 61 is as shown in FIG. 6, which is in periodic arrangement with each cycle comprising multiple triangular prism structures of different tilt angles (as shown in FIG. 6, the angles of inclination of the triangular structures in one period are respectively θ1', θ2', θ3'), and the surface of each triangular prism structure plated with reflective coating to reflect the light ray; the number of the triangular prism structures in each period is the number of the pitching angles, with the triangular prism structure at the same angle of inclination in different periods corresponding to the same pitching angle.

The reflective composite deflective diffusing screen 6 is connected with the rotating drive mechanism 5, which drives the reflective composite deflective diffusing screen 6 to rotate at a high speed. The rotating drive mechanism 5 generally drives the reflective composite deflective diffusing screen 6 to rotate through a gear drive, a worm drive and a belt drive, etc.

The high speed projector 2 is arranged over the reflective composite deflective diffusing screen 6, which reflects the image sequence processed ready downwards to the reflective composite deflecting scattering screen 6. The lens' optical axis of the high speed projector 2 coincides with the rotating axis of the reflective composite deflective diffusing screen 6.

The high speed projector 2 is sequentially connected with the image generator 3 and the detecting module 4. The detecting module 4 detects the rotating speed and initial position of the reflective composite deflective diffusing screen 6, and sends the signal to the image generator 3, which controls the initial image No. and the projecting frame frequency of the high speed projector 2, realizing synchronism of the image sequence projected by the high speed projector 2 and the rotation of the reflective composite deflective diffusing screen 6. In this embodiment, the image generator 3 is an FPGA-based control module or a DSP-based control module or a computer. The detecting module 4 is a photosensor or a mechanical position switch.

In the multi-pitching angle suspended space 3D display device with 360° FOV described above, when the light rays projected by the high speed projector 2 go through the reflective composite deflective diffusing screen 6, the light rays are deflected by the reflection of the reflective composite saw-toothed grating 61, the emitting angles in the grating direction and in the direction perpendicular to the grating direction of the deflected light rays are then respectively limited by the second cylindrical grating 62, and finally the light rays emit at a small diffusing angle in the grating direction (i.e. small angle projection), and scatter in the direction perpendicular to the grating direction at a certain angle.

When the projected light rays go through the reflective composite saw-toothed grating 61 to be reflected for light ray deflection, the deflecting angle is related to the reflectivity of the reflective composite saw-toothed grating 61 and the angles of inclination of the triangular prism structures in the reflective composite saw-toothed grating 61. Since the reflectivity of the transmitted composite saw-toothed grating 61 is a fixed value, the reflective deflecting angle is determined by the specific position of the light rays projected to the reflective composite deflective diffusing screen 6, and the reflective deflecting direction and angles of the projected light rays are determined by the angles of inclination of the triangular prism structures of the reflective composite saw-toothed grating. Therefore, the generated reflective deflecting angles corresponding to the multiple triangular prism structures of different angles of inclination in each reflective saw-toothed grating cycle in the reflective composite saw-toothed grating 61 vary, whereas the deflecting angles corresponding to the triangular prism structures of the same angle of inclination in different periods are the same. It is thus clear that the generated reflective deflecting angles corresponding to the reflective composite saw-toothed grating 61 consisting of the reflective saw-toothed gratings in a periodic arrangement are repeated arrangement of angle period of multiple reflective deflecting angles. It is also clear that in the small area corresponding to each period, the reflective composite deflecting scattering screen 6 deflects the light rays projected by the high speed projector 2 to one side at multiple angles, and scatters at a certain angle in the deflecting direction, and reflects at a small angle in the direction perpendicular to the deflecting direction.

When the light rays go through the second cylindrical grating 62 and emit at small scattering angle in the grating direction (small angle reflection), the scattering angle shall be less than 360/M'° (M' is the number of the images projected by the high speed projector 2 when the reflective composite deflective diffusing screen 6 rotates one cycle). Meanwhile, when going through the second cylindrical grating 62, the light rays scatter in the direction perpendicular to the grating direction at a certain angle that is related to the number and sizes of N separated circular watching areas. It needs to be ensured that at each circular watching area of the N circular watching areas, a viewer can see the image corresponding to that pitching angle but cannot see the images corresponding to other pitching angles. The scattering angle can be determined by selecting the cylindrical diameter and the refractive index of the second cylindrical grating 62.

Assuming that the length of each period in the reflective composite saw-toothed grating 61 is P', and there are N triangular prism structures of different angles of inclination in each period, set the bottom side length of each triangular prism structure as p', then P'=p'N. Since the number of the triangular prism structure in each period is the number of the pitching angles, the 3D display device has N pitching angles vertically, and accordingly, there are N separated circular areas of different height levels around the display device for viewers at different height levels to watch the panoramic space 3D display.

When the transmitted composite deflective diffusing screen 6 is fixed, for the viewpoints of different height levels in the N separated circular watching areas corresponding to the same horizontal position, the image seen from each viewpoint is a narrow strip image projected for that viewpoint by the high speed projector 2, and therefore the images seen from viewpoints of different height levels are different. Assuming that the resolution of the narrow strip image projected by the high speed projector 2 corresponding to a certain horizontal position is W×H, the resolution of the narrow strip image seen from each viewpoint that corresponds to the same horizontal position in the N separated circular areas is W×(H/N). This is because when there are N triangular prism structures of different angles of inclination in each reflective saw-toothed grating cycle, the reflective deflecting angles generated by reflective composite saw-toothed grating 61 are repeated arrangement of angle period of N different reflective deflecting angles, and the same reflective deflecting angle corresponds to the same pitching angle (i.e., to the same viewpoint), then the narrow strip image seen from each viewpoint is the composite of the deflected light rays that have the same reflective deflecting angle in all the periods emitted from the second cylindrical grating 62.

When the reflective composite deflective diffusing screen 6 rotates, for the viewpoints of different height levels in the N separated circular watching areas corresponding to the same horizontal position, the image seen from each viewpoint is the composite image consisting of the strips of different positions of multiple continuous images projected for that viewpoint by the high speed projector 2.

When the reflective composite deflective diffusing screen 6 rotates one cycle, and the high speed projector 2 projects M' images, if the reflective composite deflecting scattering screen 6 rotates 360/M'°, then the high speed projector 2 changes an image. To satisfy the visual persistence of naked eyes, a high refresh rate is required, which requires increasing the rotating speed of reflective composite deflective diffusing screen 6. Assuming the rotating speed of the reflective composite deflective diffusing screen 1 is ω', then the frame frequency F of the high speed projector 2 is M'ω', and the refresh rate of the 3D scene is also ω'. When the density of view angle spacing is high enough, the two naked eyes will be in two different view areas and see two different images to produce stereo visual effects, and the 3D scene formed is suspended above the reflective composite deflecting scattering screen 6. When the reflective composite deflective diffusing screen 6 rotates a cycle, the number of the images projected by the high speed projector 2 is generally over 200, i.e., M'≥200. If the system refresh rate ω' is at 15 r/s, the frame frequency F of the projector needs to reach at least 3000 frames/s, a high frame frequency projector is required. Since this multi-pitching angle 3D display is to separate the image of the same time point to different pitching angles, which results in decrease of the image resolution of a single view point. To improve the image resolution of different viewpoints, the spacial light modulator of the high speed projector 2 needs high resolution.

The most commonly used high speed projector 2 is a single-chip or three-chip DMD (digital micromirror device) projector.

In this embodiment, to ensure the separation of the images of different pitching angles, the images projected by the high speed projector 2 need to correspond to each position of each triangular prism structure in the reflective composite saw-toothed grating 61.

The invention claimed is:

1. A multi-pitching angle suspended space 3D display device with 360° field of view (FOV) comprising: a transmitted composite deflective diffusing screen, a high speed projector, an image generator, a detecting module and a rotating drive mechanism, wherein the transmitted composite deflective diffusing screen is connected with and rotates under the drive of the rotating drive mechanism; the high speed projector is arranged under the transmitted composite deflective diffusing screen, and is sequentially connected with the image generator and the detecting module;

the transmitted composite deflective diffusing screen comprises a transmitted composite saw-toothed grating and a cylindrical grating parallel to each other in the grating direction, wherein the transmitted composite saw-toothed grating is in a periodic arrangement, with each period comprising at least two triangular prism structures at different angles of declination; the number of the at least two triangular prism structures in each period is the number of the pitching angles, with the at least two triangular prism structures of the same angle of inclination in different periods corresponding to the same pitching angle;

the high speed projector projects the image upwards to the transmitted composite deflective diffusing screen; the detecting module detects the rotating speed and the initial position of the transmitted composite deflective diffusing screen, and sends the signal of the rotating speed and the initial position to the image generator; the image generator controls the initial image number and the projecting frame frequency of the high speed projector according to the signal received, realizing synchronism of the image sequence projected by the high speed projector and the rotation of the transmitted composite deflective diffusing screen.

2. The multi-pitching angle suspended space 3D display device with 360° FOV as described in claim 1, which is characterized in that the image generator is a Field Programmable Gate Array (FPGA)-based control module or a digital-signal-processor (DSP)-based control module or a computer.

3. The multi-pitching angle suspended 3D display device with 360° FOV as described in claim 1, which is characterized in that the detecting module is a photosensor or a mechanical position switch.

4. A multi-pitching angle suspended space 3D display device with 360° FOV, comprising: a reflective composite deflective diffusing screen, a high speed projector, an image generator, a detecting module and a rotating drive mechanism; wherein the reflective composite deflective diffusing screen is connected to the rotating drive mechanism, and rotates under the drive of the rotating drive mechanism; the high speed projector is arranged above the reflective composite deflective diffusing screen, and is sequentially connected with the image generator and the detecting module;

the reflective composite deflective diffusing screen comprises a reflective composite saw-toothed grating and a cylindrical grating parallel to each other in the grating direction, the reflective composite saw-toothed grating is arranged under the cylindrical grating, wherein the reflective composite saw-toothed grating is in a periodic arrangement, with each period comprising at least two triangular prism structures at different angles of declination and the surface of each of the at least two triangular prism structure plated with reflective coating; the number of the at least two triangular prism structures in each period is the number of the pitching angles, with the at least two triangular prism structures at the same angle of inclination in different periods corresponding to the same pitching angle;

the high speed projector projects the image downwards to the reflective composite deflective diffusing screen; the detecting module detects the rotating speed and the initial position of the reflective composite deflective diffusing screen, and sends the signal of the rotating speed and the initial position to the image generator; the image generator controls the initial image number and the projecting frame frequency of the high speed projector according to the signal received, realizing synchronism of the image sequence projected by the high speed projector and the rotation of the transmitted composite deflective diffusing screen.

5. The multi-pitching angle suspended space 3D display device with 360° FOV as described in claim 4, which is characterized in that the image generator is an FPGA-based control module or a DSP-based control module or a computer.

6. The multi-pitching angle suspended 3D display device with 360° FOV as described in claim 4, which is characterized in that the detecting module is a photosensor or a mechanical position switch.

* * * * *